(12) United States Patent
Wu

(10) Patent No.: US 10,999,243 B2
(45) Date of Patent: *May 4, 2021

(54) SHARING MEDIA AMONG REMOTE ACCESS CLIENTS IN A UNIVERSAL PLUG AND PLAY ENVIRONMENT

(71) Applicant: Google Technology Holdings LLC, Mountain View, CA (US)

(72) Inventor: Qi-Bin Wu, Chengdu (CN)

(73) Assignee: Google Technology Holdings LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/450,344

(22) Filed: Jun. 24, 2019

(65) Prior Publication Data

US 2019/0379634 A1 Dec. 12, 2019

Related U.S. Application Data

(63) Continuation of application No. 15/269,758, filed on Sep. 19, 2016, now Pat. No. 10,333,891, which is a (Continued)

(51) Int. Cl.
*G06F 15/16* (2006.01)
*H04L 29/12* (2006.01)
(Continued)

(52) U.S. Cl.
CPC .......... *H04L 61/25* (2013.01); *H04L 12/2809* (2013.01); *H04L 12/5691* (2013.01); *H04L 67/42* (2013.01)

(58) Field of Classification Search
CPC . H04L 61/25; H04L 12/2809; H04L 12/5691; H04L 67/42
(Continued)

(56) References Cited

U.S. PATENT DOCUMENTS 6,895,439 B2 5/2005 Isomaki et al.
7,043,528 B2 5/2006 Schmitt et al.
(Continued)

FOREIGN PATENT DOCUMENTS

CN 101444044 5/2009

OTHER PUBLICATIONS

International Search Report and Written Opinion dated Sep. 22, 2011 in International Patent Application No. PCT/CN2010/079695.
(Continued)

*Primary Examiner* — Alicia Baturay
(74) *Attorney, Agent, or Firm* — Byrne Poh LLP

(57) ABSTRACT

In general, in one aspect, the disclosure describes a Universal Plug and Play (UPnP) Remote Access Server (RAS) to provide a communication channel between UPnP Remote Access Clients (RACs) connected thereto. The UPnP RAS maintains local discovery information for UPnP devices connected to a local network and remote discovery information for remote UPnP devices communicating therewith. The UPnP RAS provides the remote UPnP devices communicating therewith with the local discovery information and the remote discovery information. The remote discovery information is utilized by a first remote UPnP device to discover a second UPnP device and vice versa. After discovery, a first remote UPnP device can communicate with a second UPnP device and vice versa.

21 Claims, 6 Drawing Sheets

Related U.S. Application Data continuation of application No. 13/885,204, filed as application No. PCT/CN2010/079695 on Dec. 13, 2010, now Pat. No. 9,451,049.

(51) Int. Cl.
*H04L 12/28* (2006.01)
*H04L 12/54* (2013.01)
*H04L 29/06* (2006.01)

(58) Field of Classification Search
USPC .......................................................... 709/220
See application file for complete search history.

(56) References Cited

U.S. PATENT DOCUMENTS

| | | |
|---|---|---|
| 7,197,565 B2 | 3/2007 | Abdelaziz et al. |
| 7,231,658 B2 | 6/2007 | Kunito et al. |
| 7,286,521 B1 | 10/2007 | Jackson et al. |
| 7,395,393 B2 | 7/2008 | Shiraki et al. |
| 7,440,440 B1 | 10/2008 | Abichandani et al. |
| 7,555,543 B2 | 6/2009 | Encarnacion et al. |
| 7,643,411 B2 | 1/2010 | Andreasen et al. |
| 7,647,385 B2 | 1/2010 | Encarnacion |
| 7,668,939 B2 | 2/2010 | Encarnacion et al. |
| 7,716,310 B2 | 5/2010 | Foti |
| 7,724,691 B2 | 5/2010 | Mela et al. |
| 7,792,025 B2 | 9/2010 | Segel et al. |
| 7,792,968 B2 | 9/2010 | Datta et al. |
| 7,804,848 B2 | 9/2010 | Mirtorabi et al. |
| 7,822,711 B1 | 10/2010 | Ranade |
| 7,822,810 B2 | 10/2010 | Dayal et al. |
| 7,866,543 B2 | 1/2011 | Asher et al. |
| 7,953,867 B1 | 5/2011 | Andreasen |
| 8,024,429 B2 | 9/2011 | Cagenius |
| 8,027,353 B2 | 9/2011 | Damola et al. |
| 8,032,589 B2 | 10/2011 | Foti |
| 8,046,479 B2 | 10/2011 | Einarsson et al. |
| 8,135,395 B2 | 3/2012 | Cassett et al. |
| 8,190,726 B2 | 5/2012 | Han et al. |
| 8,402,122 B2 | 3/2013 | Cho et al. |
| 8,423,671 B2 | 4/2013 | Kim |
| 8,503,462 B2 | 8/2013 | Damola et al. |
| 8,549,151 B2 | 10/2013 | Stokking et al. |
| 9,451,049 B2 | 9/2016 | Wu |
| 10,333,891 B2 * | 6/2019 | Wu .................... H04L 12/2809 |
| 2005/0135366 A1 | 6/2005 | Trappeniers et al. |
| 2006/0128376 A1 | 6/2006 | Alexis |
| 2006/0291472 A1 | 12/2006 | Guo et al. |
| 2007/0025301 A1 | 2/2007 | Petersson et al. |
| 2007/0244578 A1 | 10/2007 | Stirbu |
| 2008/0092178 A1 | 4/2008 | McNamara et al. |
| 2009/0044253 A1 | 2/2009 | Interlandi et al. |
| 2009/0080453 A1 | 3/2009 | Stirbu |
| 2009/0100147 A1 | 4/2009 | Igarashi |
| 2009/0180468 A1 | 7/2009 | Cho et al. |
| 2009/0180484 A1 | 7/2009 | Igarashi |
| 2009/0190603 A1 * | 7/2009 | Damola ............ H04L 29/06285 370/401 |
| 2009/0193469 A1 | 7/2009 | Igarashi |
| 2009/0210555 A1 | 8/2009 | Han et al. |
| 2009/0217337 A1 | 8/2009 | Åström |
| 2009/0235317 A1 | 9/2009 | Igarashi |
| 2009/0307307 A1 | 12/2009 | Igarashi |
| 2009/0313376 A1 | 12/2009 | Cedervall et al. |
| 2010/0005177 A1 | 1/2010 | Cagenius |
| 2010/0005501 A1 | 1/2010 | Stokking et al. |
| 2010/0228818 A1 | 9/2010 | Han et al. |
| 2011/0010459 A1 * | 1/2011 | Stokking ........... H04L 29/06517 709/231 |
| 2011/0209188 A1 | 8/2011 | Petersson et al. |
| 2013/0318151 A1 * | 11/2013 | Wu ....................... H04L 67/42 709/203 |
| 2014/0040350 A1 | 2/2014 | Stokking et al. |
| 2017/0012936 A1 * | 1/2017 | Wu ..................... H04L 12/2809 |

OTHER PUBLICATIONS

Notice of Allowance dated Feb. 12, 2019 in U.S. Appl. No. 15/269,758.
Notice of Allowance dated May 20, 2016 in U.S. Appl. No. 13/885,204.
Office Action dated Jan. 22, 2016 in CN Patent Application No. 201080070661.1.
Office Action dated Feb. 14, 2018 in U.S. Appl. No. 15/269,758.
Office Action dated Apr. 30, 2015 in CN Patent Application No. 201080070661.1.
Office Action dated Jun. 15, 2015 in U.S. Appl. No. 13/885,204.
Office Action dated Jun. 28, 2018 in U.S. Appl. No. 15/269,758.
Office Action dated Jul. 21, 2017 in U.S. Appl. No. 15/269,758.
Office Action dated Jul. 26, 2016 in CN Patent Application No. 201080070661.1.
Office Action dated Nov. 9, 2017 in U.S. Appl. No. 15/269,758.
Office Action dated Nov. 10, 2015 in U.S. Appl. No. 13/885,204.
Office Action dated Nov. 30, 2018 in U.S. Appl. No. 15/269,758.
UPNP Forum, RADA Sync Service, Specification, Sep. 30, 2009, pp. 1-2 (cover pages) and 18-20 (Section 2.7), Version 1.0.
UPNP Forum, RATA Config Service, Specification, Sep. 30, 2009, pp. 1-2 (cover pages) and 21-23 (Section 2.7), Version 1.0.
UPNP Forum, Remote Access Architecture, Specification, Sep. 30, 2009, pp. 1-2 (cover pages) and 13-28 (sections 3-5), Version 1.0.
UPNP Forum, UPnP Device Architecture, Specification, Apr. 24, 2008, pp. 1-80, Version 1.0.

* cited by examiner

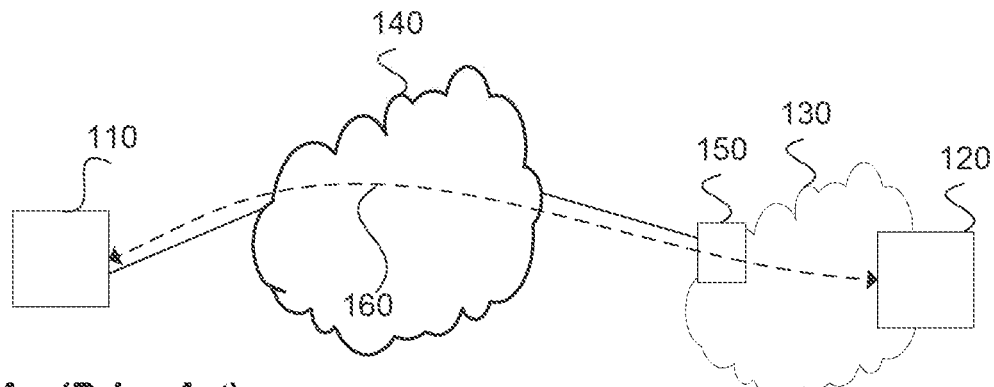
FIG. 1A *(Prior Art)*
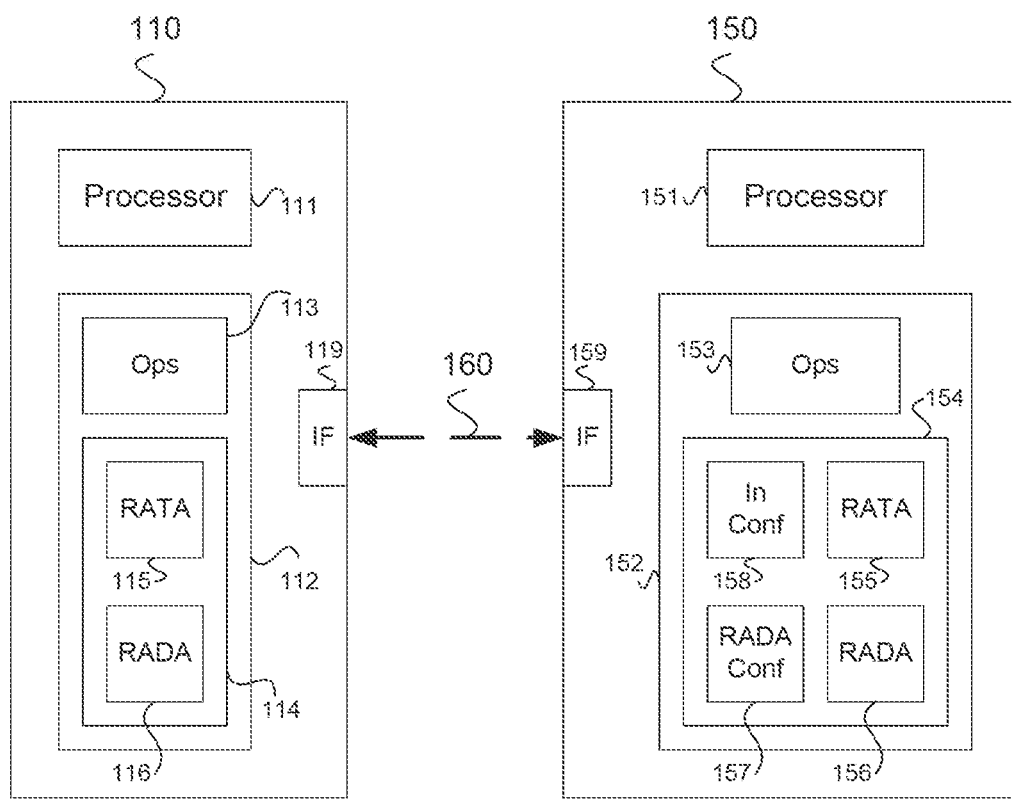
FIG. 1B *(Prior Art)*

SHARING MEDIA AMONG REMOTE ACCESS CLIENTS IN A UNIVERSAL PLUG AND PLAY ENVIRONMENT

CROSS-REFERENCE TO RELATED APPLICATIONS

This application is a continuation of U.S. patent application Ser. No. 15/269,758, filed Sep. 19, 2016, which is a continuation of U.S. patent application Ser. No. 13/885,204, filed May 14, 2013, which is the United States National Phase Application Under 35 U.S.C. § 371 of International Application No. PCT/CN2010/079695, filed Dec. 13, 2010, each of which is hereby incorporated by reference herein in its entirety.

BACKGROUND

Universal Plug and Play (UPnP) technology was initially deployed in local area networks. UPnP technology enables UPnP devices to be added to a UPnP local network without the need for drivers or configuring of the device and/or network. The device and the network can discover each other, the device can be assigned an ID (IP address) by the network, the device and network can exchange information, and then the device and other devices attached to the network can communicate using the associated IP addresses. UPnP has been expanded beyond the physical boundaries of local area networks to enable remote devices to have remote access to the network.

FIG. 1A illustrates an example connection of a remote device (e.g., portable computer, wireless device) 110 to a device 120 connects to a local network (e.g., home network) 130 utilizing UPnP technology. The remote device 110 connects to a router and or gateway 150 of the local network 130 via the Internet 140 and then once connected to the local network 130 connects to the local device 120. Before the UPnP device 110 can be used to remotely access the UPnP network 130 and the UPnP device(s) 120 connected thereto, a Remote Access Server (RAS) has to be established within the local network 130 (e.g., in the router/gateway 150) and the device 110 needs to be established as a Remote Access Client (RAC).

FIG. 1B illustrates a simplified block diagram of example devices 110, 150 configured as a RAC and a RAS respectively and a secure communications link 160 therebetween. The remote device 110 can include a processor 111, a computer readable storage medium 112, and a communication interface 119. The processor 111, the computer readable storage medium 112, and the communication interface 119 are not limited to any particular type, configuration, or number as these may vary based on, among other things, the device 110 and the system the device 110 is operating in. The computer readable storage medium 112 can be in whole or part external to the device 110.

The computer readable storage medium 112 can store processor-executable instructions, which, when executed by the processor 111 cause the processor 111 to perform certain functions and the device 110 to operate in a certain fashion. The processor-executable instructions can include operational instructions 113 and RAC instructions 114. The operational instructions 113 can be used to operate the device 110 and the services performed by the device 110 or the applications running on the device 110. The operational instructions 113 are illustrated as a single block but are in no way limited to a single set of instructions. Rather, the operational instructions 113 can be a plurality of instructions sets necessary to operate the device 110 and the applications running thereon.

The RAC instructions 114 can include Remote Access Transport Agent (RATA) instructions 115 and Remote Access Discovery Agent (RADA) instructions 116. The RATA instructions 115 can provide the secure communications between the device 110 and the router 150 via the communications interface 119. The RADA instructions 116 can maintain discovery information for the device 110 and other local devices connected thereto (RAC discovery information), can synchronize the local RAC discovery information to the router/gateway (configured as a RAS) 150 once communications have been established therebetween, can receive the discovery information for devices local to the RAS 150 (RAS discovery information) and can maintain the RAS discovery information as remote discovery information.

The router/gateway 150 can include a processor 151, a computer readable storage medium 152, and a communication interface 159. The processor 151, the computer readable storage medium 152, and the communication interface 159 are not limited to any particular type, configuration, or number as these may vary based on, among other things, the router/gateway 150 and the system the router/gateway 150 is operating in. The computer readable storage medium 152 can store processor-executable instructions, which, when executed by the processor 151 cause the processor 151 to perform certain functions. The processor-executable instructions can include operational instructions 153 and RAS instructions 154. The operational instructions 153 can be used to operate the router/gateway 150 and the services performed thereby (e.g., routing).

The RAS instructions 154 can include RATA instructions 155, RADA instruction 156, RADA configuration instructions 157, and inbound connection configuration instructions 158. The RATA instructions 155 can provide the secure communications between the router/gateway 150 and the device 110 via the communications interface 159. The RADA instructions 156 can maintain discovery information for devices 120 connected to the local network 130 (RAS discovery information), can receive discovery information for remote devices (configured as a RAC) 110 once communications have been established therebetween (RAC discovery information), can maintain the RAC discovery information as remote discovery information, and can synchronize the local RAS discovery information to the RAC 110 once communications have been established therebetween.

The RADA configuration instructions 157 can enable the operator of the network 130 to limit the local discovery information that the router/gateway 150 provides to RACs. For example, if a secure server was included on the network 130 the instructions 157 could restrict the discovery information associated therewith from being synchronized with remote devices 110. The inbound connection configuration instructions 158 can verify that the RAS can be reached by the Internet (e.g., public IP address) and configure settings to allow the RACs to establish a RATA connection thereto.

Once the RAS 150 and the RAC 110 are configured, the RAC 110 can initiate contact with the RAS 150 and a Remote Access Transport (RAT) channel 160 can be established therebetween. Once the RAT channel 160 is established, the RADA instructions 116, 156 can synchronize UPnP discovery information between the RAC 110 and RAS 150. After discovery information is synched, the remote device 110 can communicate with the local devices 120 and vice versa in a similar fashion to the local devices 120 communicating therebetween subject to parameters associated with external networks and access points between networks.

FIG. 2 illustrates an example connection between a plurality of remote devices (e.g., portable computer, wireless device) 210, 220 and a local network (e.g., home network) 230 utilizing UPnP technology. The remote devices 210, 220 can be configured as RACs (as illustrated) or can be connected to a network 214, 224 that includes devices configured as RACs. A router or gateway 232 of the local network 230 can be configured as a RAS (as illustrated) or the RAS can be a separate device on the network 230. The remote devices 210, 220 can include media servers 212, 222 or the devices 210, 220 can be connected to the media servers 212, 222 via the respective network 214, 224 (as illustrated). RAT channels 240, 250 can be established between the corresponding RAC 210, 220 and the RAS 232 of the local network 230 via the Internet 260.

A user of the RAC 210 (or other devices connected to the network 214 such as a media server 212) can discover the media server 234 and access content thereon, and a user of a device (e.g., media server 234) on the local network 230 can discover the media server 212 and access content thereon via the RAT channel 240. Likewise, a user of the RAC 220 (or other devices connected to the network 224 such as a media server 222) can discover the media server 234 and access content thereon, and a user of a device on the local network 230 can discover the media server 222 and access content thereon via the RAT channel 250.

FIG. 3 illustrates an example of discovery information aggregated for each of the RACs 210, 220 and the RAS 232 of FIG. 2. The discovery information for the RAS 232 includes information related to the local network 230 including information for the media server 234, information for the remote network 214 including information related to the media server 212 and information for the remote network 224 including information related to the media server 222. The discovery information for the RAC 210 includes information related to its local network 214 including information for the media server 212 and information for the remote home network 230 including information related to the media server 234. The discovery information for the RAC 220 includes information related to its local network 224 including information for the media server 222 and information for the remote home network 230 including information related to the media server 234.

As the RAC 210 does not include information about the network 224 or the devices connected thereto it can not discover the network 224 or the devices 220, 222 connected thereto. Likewise, as the RAC 220 does not include information about the network 214 or the devices connected thereto it can not discover the network 214 or the devices 210, 212 connected thereto. As such, users of devices 210, 212 on the network 214 (user A) can not communicate with the users of devices 220, 222 on the network 224 (user B) or vice versa. That is, there is no RAC to RAC communications vehicle.

Accordingly, if a user A wanted to share some media (e.g., pictures, videos) from their media server 212 with user B they would have to copy the content to media server 234 and then user B could access the content from the media server 234. The same would be the case if user B wanted to share content with user A. Having to copy content to the media server 234 on the local network (home network) 230 is not convenient or efficient and has issues associated therewith. For example, the media server 234 may not have sufficient storage or the users of the network 230 may not want the remote users (users A and B) copying data to the media server 234. Furthermore, the remote users (users A and B) may only want to share their content with certain devices and not everyone having access to the media server 234 and requiring the media server 234 to provide access control for remote content copied thereto would be burdensome.

In order for user A to share content with user B and vice versa without the need to copy the content to the media server 234 that they both have access to, user A (or user B) would need to configure a device within their network 214 (or network 224) as a RAS and would need to identify the RAC 220 (or RAC 210) as an authorized user in order to establish a RAT channel therebetween. The device to be configured as the RAS would need to have a public IP address that could be used to allow access to user B (or user A). Configuring a remote device to be a RAS is not convenient or efficient and has issues associated therewith. For example, the occasions when the remote devices may want to remotely share content may be limited and therefore not justify the configuration effort. Additionally, the remote devices wishing to share content remotely may not be capable of being assigned a public IP address or being reached remotely over the Internet. Furthermore, the remote devices may not have sufficient storage medium capacity or processor capability to store or run the RAS instructions 154. Moreover, the network that the remote device is connected to may not be designed to allow external discovery of network devices (e.g., work network with firewalls).

SUMMARY

A universal plug and play (UPnP) remote access server (RAS) to enable communications between UPnP remote access clients (RACs) connected thereto is disclosed. The UPnP RAS includes a processor and computer readable storage medium to store processor-executable instructions. The processor-executable instructions, when executed by the processor, cause the processor to: establish a first remote access transport (RAT) channel with a first remote UPnP device that initiates communication therewith; receive discovery information for the first remote UPnP device; add the discovery information for the first remote UPnP device to a first remote branch of discovery information; establish a second RAT channel with a second remote UPnP device that initiates communication therewith; and provide the first remote branch of discovery information to the second remote UPnP device. The second remote UPnP device can discover the first remote UPnP device based on the first remote branch of discovery information provided thereto and can access the first remote UPnP device using the second RAT channel from the second remote UPnP device and the first RAT channel to the first remote UPnP device.

A UPnP RAS to enable communications between UPnP RACs connected thereto is disclosed. The UPnP RAS includes a first interface to communicate with a local network and UPnP devices connected thereto and a second interface to communicate externally via the Internet. A remote access transport agent (RATA) is configured to establish RAT channels with remote UPnP devices that initiate communication therewith. A remote access discovery agent (RADA) is configured to: detect local UPnP devices connected to the local network; receive discovery information for the local UPnP devices; add the discovery information for the local UPnP devices to a local branch of discovery information; receive discovery information for a first remote UPnP device to communicate therewith; add the discovery information for the first remote UPnP device to a first remote branch of discovery information; provide the local branch of discovery information to the first remote UPnP device; receive discovery information for a second remote UPnP device to communicate therewith; add the discovery information for the second remote UPnP device to a second remote branch of discovery information; provide the local branch of discovery information to the second remote UPnP device; provide the first remote branch of discovery information to the second remote UPnP device; and provide the second remote branch of discovery information to the first remote UPnP device. The second remote UPnP device can utilize the first branch of discovery information to discover the first remote UPnP device and can access the first remote UPnP device using the RAT channels between the second remote UPnP device and the UPnP RAS and the UPnP RAS and the first remote UPnP device. The first remote UPnP device can utilize the second branch of discovery information to discover the second remote UPnP device and can access the second remote UPnP device using the RAT channels between the first remote UPnP device and the UPnP RAS and the UPnP RAS and the second remote UPnP device.

A processor implemented method performed in a UPnP RAS to provide a communication channel between UPnP RACs connected thereto is disclosed. The processor implemented method includes the processor: maintaining local discovery information for UPnP devices connected to a local network; maintaining remote discovery information for remote UPnP devices communicating therewith; and providing the remote UPnP devices communicating therewith with the local discovery information and the remote discovery information. The remote discovery information is utilized by a first remote UPnP device to discover a second UPnP device.

BRIEF DESCRIPTIONS OF THE DRAWINGS

The features and advantages of the various embodiments will become apparent from the following detailed description in which:

FIG. 1A illustrates an example connection of a remote device to a local device utilizing universal plug and play (UPnP) technology, according to the prior art.

FIG. 1B illustrates a simplified block diagram of example devices configured as a remote access client (RAC) and a remote access server (RAS) respectively and a secure communications link therebetween, according to the prior art.

DETAILED DESCRIPTION

Figure 2:
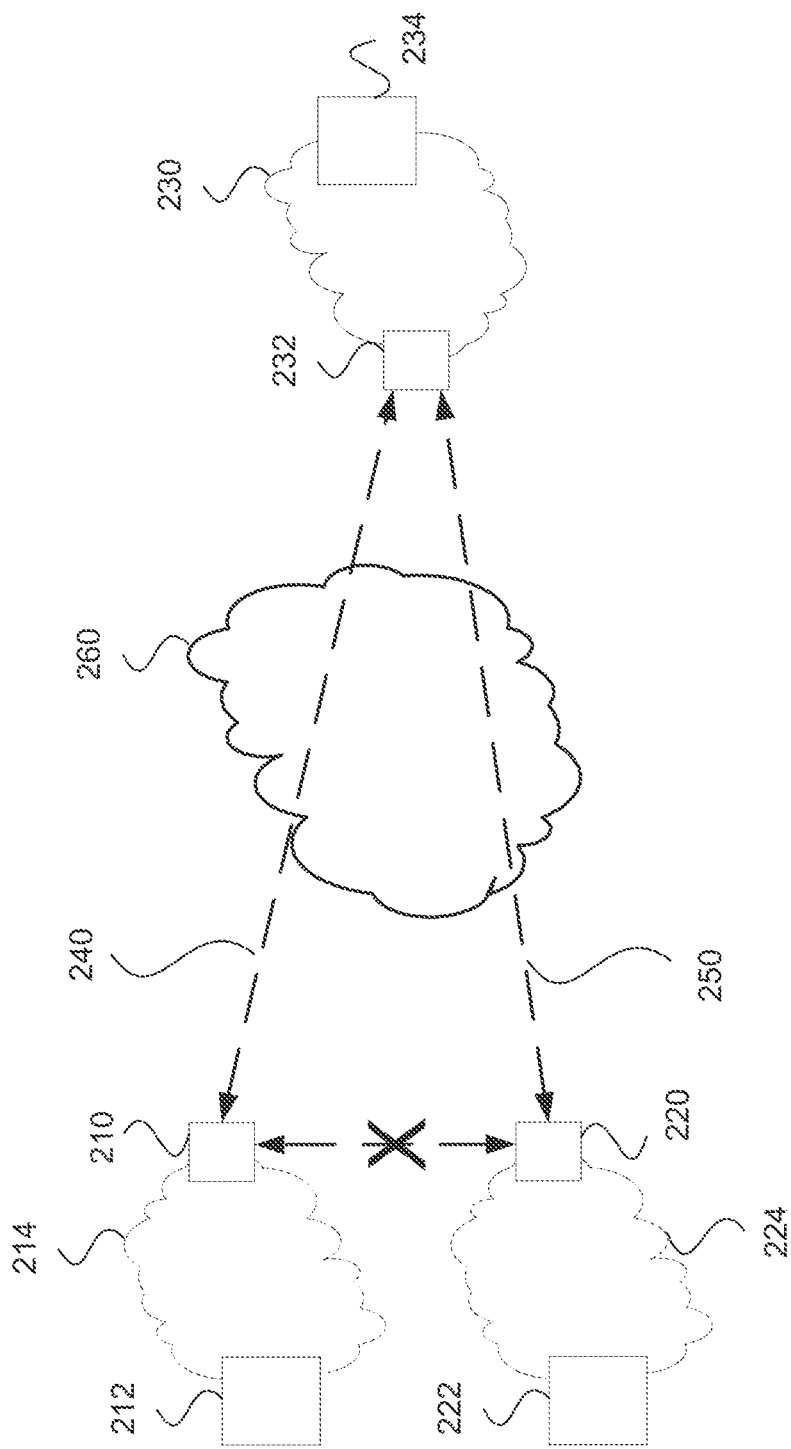
FIG. 2 illustrates an example connection between a plurality of remote devices and a local network utilizing UPnP technology, according to the prior art.

Referring to components illustrated in FIG. 2, the current invention can provide a Remote Access Server (RAS) 232 that enables the remote devices configured as Remote Access Clients (RACs) 210, 220 to communicate with one another (e.g., share content) without the need to copy their content to the media server 234 on the local network 230 or configure one of the remote devices 210, 220 as a RAS. The RAS 232 of the current invention can enable the RAC 210 (or RAC 220) to discover the other RAC 220 (or RAC 210) connected to the RAS 232. If the RACs 210, 220 can discover each other they can utilize the existing Remote Access Transport (RAT) channels 240, 250 between the RAS and the RACs 210, 220 respectively to communicate (exchange information) with one another.

Figure 3:
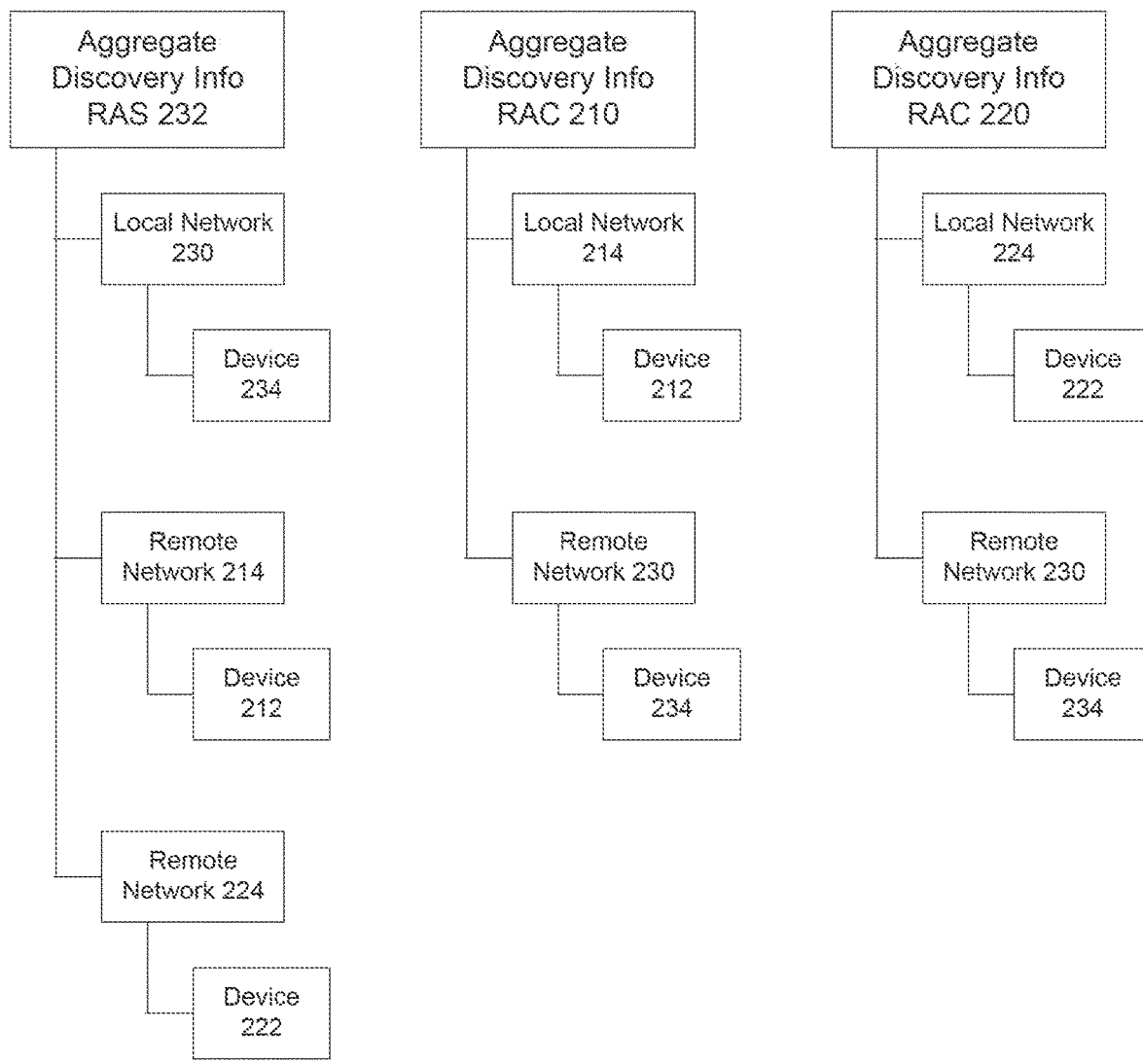
FIG. 3 illustrates an example of discovery information aggregated for each of the RACs and the RAS of FIG. 2, according to the prior art.

Referring to components illustrated in FIG. 1B, the Remote Access Discovery Agent (RADA) instructions 116 can maintain discovery information for the RAC and devices connected to the RAC (local discovery information) and discovery information provided by the RAS for devices connected to the RAS (remote discovery information). The RADA instructions 156 can maintain discovery information for devices connected to the RAS (local discovery information) and discovery information provided by the RAC for the RAC and the devices connected thereto (remote discovery information). As illustrated in FIG. 3, if multiple RACs are in communication with the RAS, the RADA instructions 156 can maintain multiple remote discovery branches (e.g., a branch for each RAC).

The RADA instructions 116 (or 156) can provide their local discovery information to the RAS (or RAC) when communications between the RAC and RAS are first established. In addition, RADA instructions 116 (or 156) can provide their local discovery information to the RAS (or RAC) when the local discovery information changes (e.g., local device added, local device removed). Based on the local and remote discovery information maintained for a RAC, the RAC can discover and access any devices connected to itself or the RAS. Based on the local and remote discovery information maintained for a RAS, devices connected to the RAS can discover and access any other devices connected to the RAS, or any RAC or any devices connected to any RAC in communication with the RAS.

According to one embodiment, the RADA instructions 156 can be modified to synchronize both its local discovery information and its remote discovery information with any RACs connected thereto. The RADA instructions 156 can synchronize the local and remote discovery information when communications is first established with a RAC and when changes are made to the local discovery information or the remote discovery information. The changes to the remote discovery information can include the addition of a new remote discovery information when communications with a new RAC is established or the update of a remote branch based on updated discovery information received from a current RAC. The synchronization of the remote discovery information by the RADA instructions 156 enables the RADA instructions 116 to receive and maintain remote discovery information for the RAS as well as other RACs in communication with the RAS.

The RADA configuration instructions 157 can be modified to enable the operator of the network or a user of a RAC to filter the remote discovery information that the RADA instructions 156 provide to the RADA instructions 116. For example, a user of a remote device containing proprietary data may want the number of remote users having access thereto blocked or limited. The RADA instructions 116 may need to be modified to maintain separate branches of remote discovery information (e.g., one branch for each remote connection).

With a RAC having the discovery information for other remote RACs maintained therein, the RAC can use the discovery information to discover and access the other remote RACs or devices connected thereto. Communications (e.g., file sharing) between remote RACs (or devices connected to the remote RACs) can be accomplished without the need to copy content to a device (e.g., media server) connected to the RAS via a local network.

Figure 4:
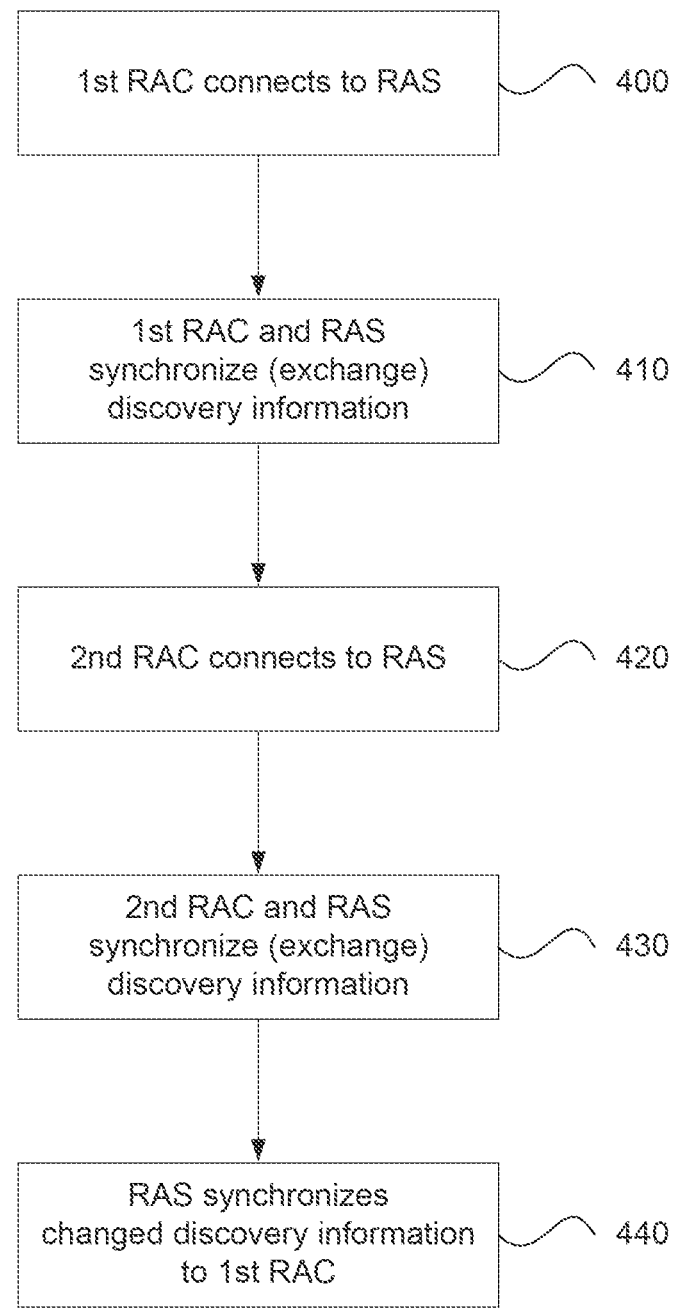
FIG. 4 illustrates a flow chart of example high level actions to enable remote devices to discover one another by utilizing the RAS, according to one embodiment.

FIG. 4 illustrates a flow chart of example high level actions that can be taken to enable first and second remote devices (RACs) to discover one another by utilizing a RAS. The flow chart starts under the assumption that the RAS and the RACs have been configured and that the RACs are authorized to access the RAS. Initially, the first RAC (e.g., RAC 210 in FIG. 2) can connect to the RAS (e.g., RAS 232 in FIG. 2) 400. The first RAC and the RAS can then synchronize their discovery information 410. The first RAC can provide its local discovery information (discovery information about itself and what can be connected thereto) to the RAS and the RAS can add this discovery information as a remote branch. The RAS can provide all its discovery information to the first RAC. As the RAS only has local discovery information at this point (excluding the remote discovery information just added for the first RAC that is the same as the local discovery information for the first RAC) that is all that is provided to the first RAC. The first RAC can add this discovery information as a remote branch. The first RAC can propagate the remote branch discovery information (provided by the RAS) to other devices connected thereto (e.g., the media server 212 or other devices connected to the network 214 in FIG. 2).

The second RAC (e.g., RAC 220 in FIG. 2) can connect to the RAS 420. The second RAC and the RAS can then synchronize their discovery information 430. The second RAC can provide its local discovery information to the RAS and the RAS can add this discovery information as a remote branch. The remote branch for the second RAC can be separate from the remote branch for the first RAC. The RAS can provide all its discovery information to the second RAC. The discovery information can include local discovery information and remote discovery information for the first RAC (the remote discovery information just added for the second RAC that is the same as the local discovery information for the second RAC can be excluded). The second RAC can add the local RAS discovery information and the remote first RAC discovery information as a remote branch (or remote branches). The remote branch for the RAS can be separate from the remote branch for the first RAC. The second RAC can propagate the discovery information from the remote branches (provided by the RAS) to other devices connected thereto (e.g., the media server 222 or other devices connected to the network 224 in FIG. 2).

The addition of the discovery information for the second RAC to the remote discovery information for the RAS is a change to the discovery information of the RAS that can initiate the RAS synchronizing its discovery information. The synchronizing of the discovery information can be limited to the first RAC (since the changes were initiated by the second RAC and the second RAC remote branch of the RAS is the same as the local branch for the second RAC). The RAS can synchronize all of its discovery information, just the remote discovery information, or just the newly added remote discovery information. The first RAC can add the new discovery information to a remote branch (new remote branch separate from remote branch capturing RAS). The first RAC can propagate the new remote branch discovery information (provided by the RAS) to other devices connected thereto (e.g., the media server 212 or other devices connected to the network 214 in FIG. 2).

Figure 5:
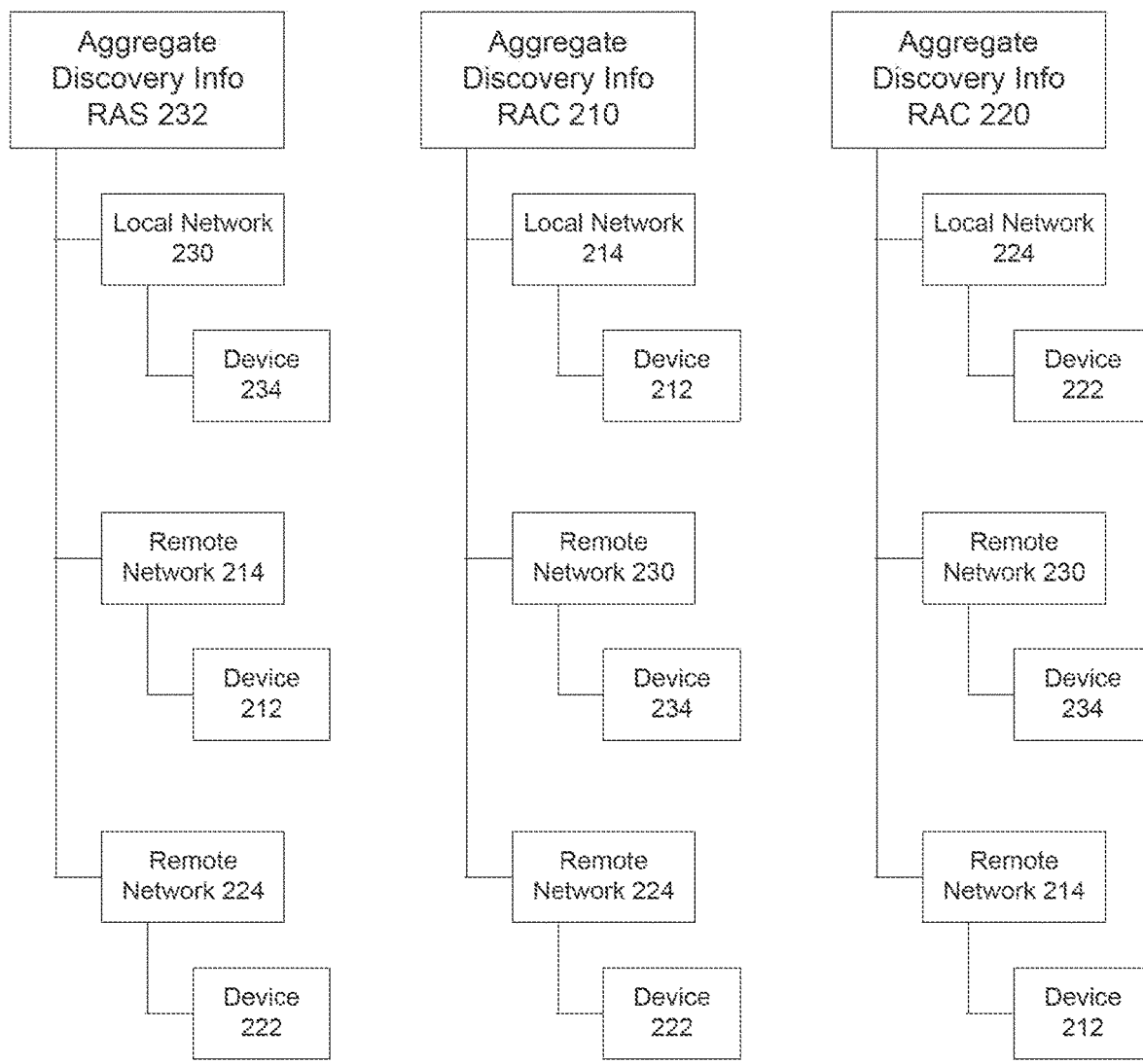
FIG. 5 illustrates an example of aggregated discovery information for the RACs and the RAS of FIG. 2 utilizing the example flow chart of FIG. 4, according to one embodiment.

FIG. 5 illustrates an example of aggregated discovery information for the RACs 210, 220 and the RAS 232 of FIG. 2 utilizing the example flow chart of FIG. 4. The discovery information for the RAS 232 is like that illustrated in FIG. 3 (local network 230 information, remote network 214 information, and remote network 224 information). The discovery information for the RAC 210 includes its local network 214 information and the remote home network 230 information as previously illustrated in FIG. 3, in addition to discovery information for the remote network 224 including information related to the media server 222 (provided by the RAS 232). The discovery information for the RAC 220 includes local network 224 information and remote home network 230 information as previously illustrated in FIG. 3, in addition to discovery information for the remote network 214 including information related to the media server 212 (provided by the RAS 232).

Figure 6:
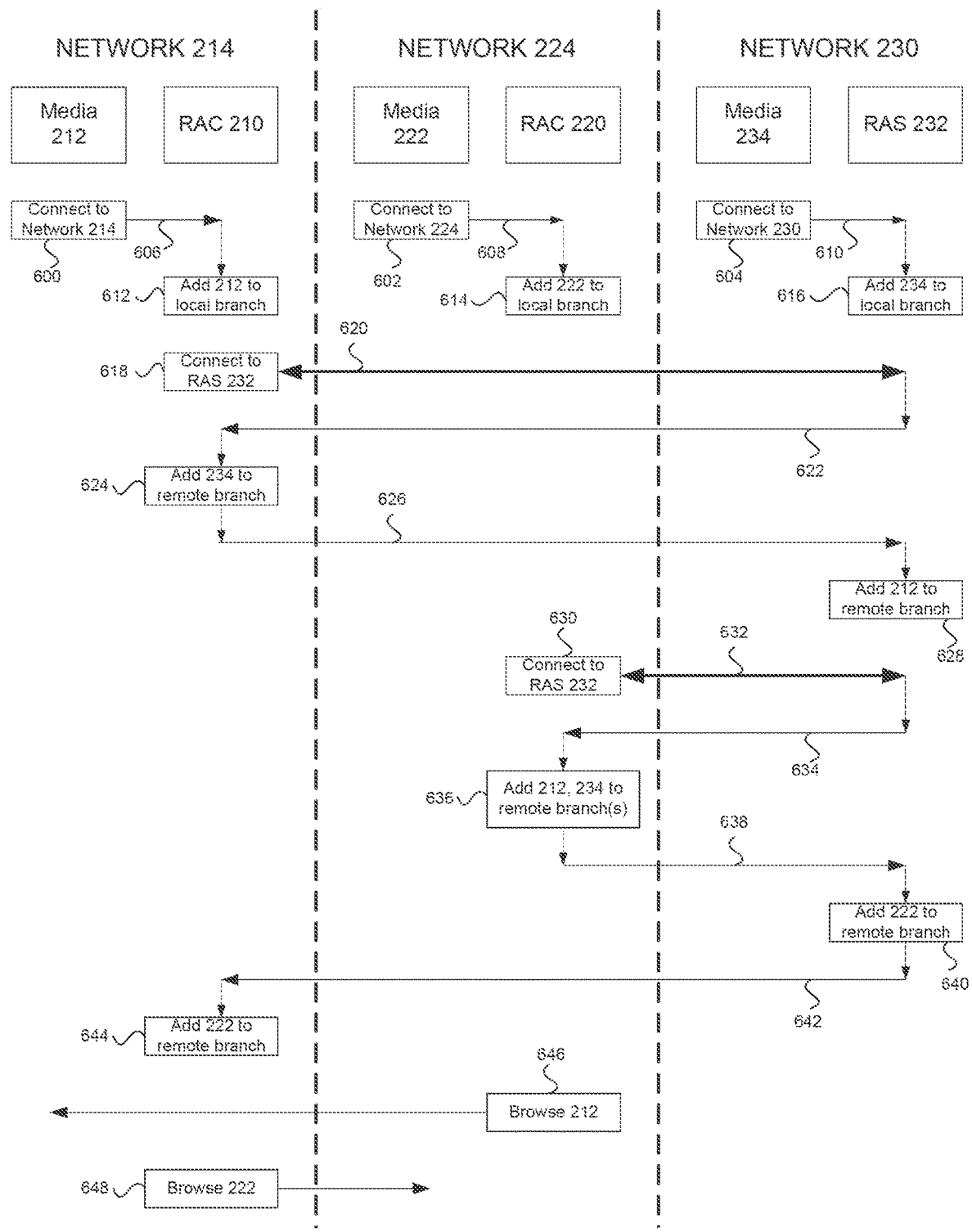
FIG. 6 illustrates a detailed process flow diagram of example actions to be taken by each of the associated devices of FIG. 2 to enable the RACs to discover one another by utilizing the RAS, according to one embodiment.

FIG. 6 illustrates a detailed process flow diagram of example actions to be taken by each of the associated devices of FIG. 2 that will enable the remote devices (RACs) 210, 220 to discover one another by utilizing the RAS 232. The diagram is broken down into each of the respective networks 214, 224, 230 and their associated devices (media server 212, RAC 210, media server 222, RAC 220, media server 234 and RAS 232).

Initially each of the media servers 212, 222, 234 connect to the respective networks 214, 224, 230 (600, 602, 604). The media servers 212, 222, 234 can send the networks 214, 224, 230 messages (e.g., ssdp:alive messages) to indicate they desire to connect thereto (606, 608, 610). The RACs 210, 220 and RAS 232 can receive these messages and discover the media servers 212, 222, 234 and then add the media servers 212, 222, 234 to their local branch of discovery information (612, 614, 616).

The RAC 210 can connect to the RAS 232 (618) and a secure RAT channel can be established between the RAC 210 and the RAS 232 (620). The RAS 232 can synchronize the device information from its local branch (e.g., media server 234) to RAC 210 (622). The RAC 210 can add the media server 234 to a remote branch of discovery information (624). The remote branch can be associated with the network 230. The RAC 210 can synchronize the device information from its local branch (e.g., media server 212) to the RAS 232 (626). The RAS 232 can add the media server 212 to a remote branch of discovery information (628). The remote branch can be associated with the network 214.

The RAC 220 can connect to the RAS 232 (630) and a secure RAT channel can be established between the RAC 220 and the RAS 232 (632). The RAS 232 can synchronize the device information from its local branch (e.g., media server 234) and from its remote branch (e.g., media server 212) to RAC 220 (634). The RAC 220 can add the media servers 212, 234 to a remote branch(s) of discovery information (636). The media server 212 can be added to a remote branch associated with network 214 and the media server 234 can be added to a remote branch for the network 230. The synchronization of media servers (634) and the adding of the media servers to remote branches (636) are illustrated as happening together, but could be preformed separately without departing from the current scope. That is, the RAS 232 could synchronize its local branch first and then synchronize its remote branch or vice versa.

The RAC 220 can synchronize the device information from its local branch (e.g., media server 222) to the RAS 232 (638). The RAS 232 can add the media server 222 to a remote branch of discovery information (640). The remote branch can be associated with the network 224. The RAS 232 can then synchronize the device information from its remote branch (e.g., media server 222) to the RAC 210 (642). The RAC 210 can add the media server 222 to a remote branch of discovery information (644). The media server 222 can be added to a remote branch associated with network 224.

The RACs 210, 220 now include discovery information for other remote networks. After the discovery information is propagated to the networks 214, 224, the RAC 220 can find and browse the media content of media server 212 (646) and the RAC 210 can find and browse the media content of media server 222 (648).

The synchronization of both local and remote discovery information by a RAS 232 enables communications between the remote devices (configured as authorized RACs) 210, 220 to occur while only utilizing a single RAS (avoid unnecessary complex configuration of an additional RAS, only require one public IP address). The remote devices (RACs) 210, 220 can easily share their own media content (or content from media servers 212, 222) with each other by connecting to the RAS 232. Digital home network users can more easily and conveniently share media content with each other even when the users are all remote from the home network 230.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed is:

1. A system for remote communications between remote access clients connected thereto, the system comprising:
   a memory; and
   a hardware processor that, when executing computer-readable instructions stored in the memory, is configured to:
      establish a first communications channel with a first remote device;
      in response to establishing the first communications channel with the first remote device, exchange discovery information with the first remote device by receiving a first portion of discovery information from the first remote device and transmitting at least a portion of aggregated discovery information to the first remote device, and add the first portion of discovery information received from the first remote device to the aggregated discovery information;
      establish a second communications channel with a second remote device; and
      in response to establishing the second communications channel with the second remote device, transmit at least the portion of aggregated discovery information to the second remote device based on allowance information specified by the first remote device that indicates whether the second remote device is allowed access to the first remote device.

2. The system of claim 1, wherein the hardware processor is further configured to determine whether to exchange discovery information for the first remote device and the second remote device based on the allowance information for accessing the first remote device, wherein the at least the portion of aggregated discovery information is transmitted to the second remote device in response to determining that the discovery information for the first remote device is to be exchanged with the second remote device.

3. The system of claim 2, wherein, in response to determining that the discovery information for the first remote device is to be exchanged with the second remote device, the hardware processor is further configured to exchange discovery information with the second remote device by:
   receiving a second portion of discovery information from the second remote device;
   adding the second portion of discovery information to the aggregated discovery information; and
   transmitting the second portion of discovery information to the first remote device.

4. The system of claim 3, wherein the first remote device discovers the second remote device based on the second portion of discovery information.

5. The system of claim 1, wherein the hardware processor is further configured to:
   detect local devices connected to a local network;
   receive discovery information associated with the local devices; and
   add the discovery information associated with the local devices to the aggregated discovery information.

6. The system of claim 5, wherein the first remote device discovers the local devices based on the aggregated discovery information and accesses one or more of the local devices using the first communications channel.

7. The system of claim 5, wherein the second remote device discovers the local devices based on the aggregated discovery information and accesses one or more of the local devices using the second communications channel.

8. The system of claim 5, wherein the hardware processor is further configured to:
   detect changes to the local devices connected to the local network;
   update the discovery information for the local devices in a local branch of the aggregated discovery information; and
   transmit the updated local branch of aggregated discovery information to each of the first remote device and the second remote device.

9. The system of claim 1, wherein the hardware processor is further configured to:
   receive updated discovery information for the first remote device;
   update a remote branch of the aggregated discovery information to reflect the updated discovery information for the first remote device; and
   transmit the updated remote branch of the aggregated discovery information to the second remote device.

10. The system of claim 1, wherein the hardware processor is further configured to:
    receive updated discovery information for the second remote device;
    update a remote branch of the aggregated discovery information to reflect the updated discovery information for the second remote device; and
    transmit the updated remote branch of the aggregated discovery information to the first remote device.

11. A method for remote communications between remote access clients connected thereto, the method comprising:
- establishing a first communications channel with a first remote device;
- in response to establishing the first communications channel with the first remote device, exchanging discovery information with the first remote device by receiving a first portion of discovery information from the first remote device and transmitting at least a portion of aggregated discovery information to the first remote device, and add the first portion of discovery information received from the first remote device to the aggregated discovery information;
- establishing a second communications channel with a second remote device; and
- in response to establishing the second communications channel with the second remote device, transmitting at least the portion of aggregated discovery information to the second remote device based on allowance information specified by the first remote device that indicates whether the second remote device is allowed access to the first remote device.

12. The method of claim 11, further comprising determining whether to exchange discovery information for the first remote device and the second remote device based on the allowance information for accessing the first remote device, wherein the at least the portion of aggregated discovery information is transmitted to the second remote device in response to determining that the discovery information for the first remote device is to be exchanged with the second remote device.

13. The method of claim 12, further comprising exchanging discovery information with the second remote device in response to determining that the discovery information for the first remote device is to be exchanged with the second remote device by:
- receiving a second portion of discovery information from the second remote device;
- adding the second portion of discovery information to the aggregated discovery information; and
- transmitting the second portion of discovery information to the first remote device.

14. The method of claim 13, wherein the first remote device discovers the second remote device based on the second portion of discovery information.

15. The method of claim 11, further comprising:
- detecting local devices connected to a local network;
- receiving discovery information associated with the local devices; and
- adding the discovery information associated with the local devices to the aggregated discovery information.

16. The method of claim 15, wherein the first remote device discovers the local devices based on the aggregated discovery information and accesses one or more of the local devices using the first communications channel.

17. The method of claim 15, wherein the second remote device discovers the local devices based on the aggregated discovery information and accesses one or more of the local devices using the second communications channel.

18. The method of claim 15, further comprising:
- detecting changes to the local devices connected to the local network;
- updating the discovery information for the local devices in a local branch of the aggregated discovery information; and
- transmitting the updated local branch of aggregated discovery information to each of the first remote device and the second remote device.

19. The method of claim 11, further comprising:
- receiving updated discovery information for the first remote device;
- updating a remote branch of the aggregated discovery information to reflect the updated discovery information for the first remote device; and
- transmitting the updated remote branch of the aggregated discovery information to the second remote device.

20. The method of claim 11, further comprising:
- receiving updated discovery information for the second remote device;
- updating a remote branch of the aggregated discovery information to reflect the updated discovery information for the second remote device; and
- transmitting the updated remote branch of the aggregated discovery information to the first remote device.

21. A method for remote communications between remote access clients connected thereto, the method comprising:
- maintaining local discovery information for local devices connected to a local network;
- maintaining remote discovery information for remote devices communicating therewith; and
- in response to connecting with each of the remote devices:
  - determining whether to exchange the local discovery information and the remote discovery information based on a number of remote users allowed to access the remote devices that is specified by each remote device of the remote devices; and
  - in response to determining that the local discovery information and the remote discovery information are to be exchanged, exchanging the local discovery information and the remote discovery information with the connected remote device by receiving a portion of discovery information from the connected remote device, and transmitting the local discovery information and the remote discovery information for the remote devices communicating therewith.

* * * * *